I. J. Way,
Cotton Press.
Nº 50,971. Patented Nov. 14, 1865.
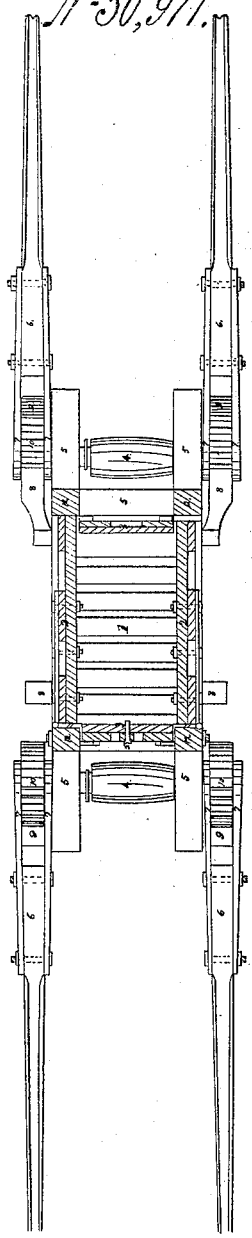
Section through A.B.
View of outer end of lever.
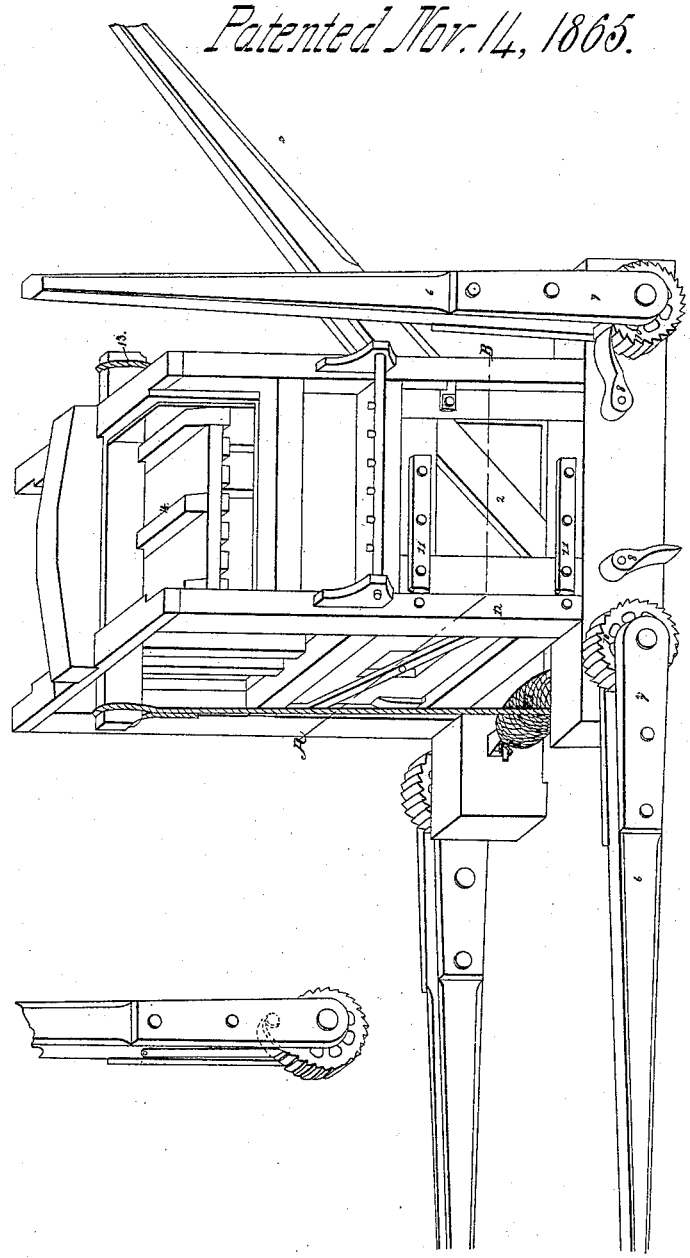
Witnesses,
John W. McIntyre
Charles Elliott
Inventor.
Isaac J. Way

UNITED STATES PATENT OFFICE.

ISAAC J. WAY, OF MEMPHIS, TENNESSEE.

IMPROVEMENT IN COTTON-PRESSES.

Specification forming part of Letters Patent No. 50,971, dated November 14, 1865.

*To all whom it may concern:*

Be it known that I, ISAAC J. WAY, of Memphis, in the county of Shelby and State of Tennessee, have invented certain new and useful Improvements in Cotton-Presses; and I do hereby declare that the following is a full, clear, and exact description of the construction and operation of the same, reference being had to the annexed drawings, making a part of this specification.

Figure 1 is an isometric view of the press. Fig. 2 is a horizontal section through the line A B. Fig. 3 is a view of the outer end of the levers.

The same figures represent identical parts.

The frame 12 12 is erected upon heavy sills 5 5 5 5. Through the extremities of the longitudinal sills pass the axles 4 4. On the outer extremities of these axles are fixed the iron ratchet-wheels 10 10, and on either side of these wheels are attached the bifurcated arms 7 7 7 7 of the levers 6 6. These levers move freely on the axle, the outer arm being attached by a round hole, the inner one having a half-round bearing on the axle, but opening through one side, so as to permit the inner side to be detached without removing the ratchet-wheel, by taking off the outer arm, by removing the bolts which attach the iron arms to the wooden lever.

To the sills are attached the strong iron ratchets 8 8 by strong bolts. Another ratchet, as shown in Fig. 3, is fixed between the arms of the levers 7 7, held in connection with the teeth of the ratchet-wheel by wooden springs attached to the wooden part of the lever 6 6 by round bolts, so as to permit the spring to be turned to one side to free the ratchet. When this spring is removed and the levers are turned down the ratchet falls by its own weight.

To the axles 4 4 strong cables are attached, fastened by an eye to the outer extremities of the cross-head A. These cables are attached to projections upon the journal, as shown in Fig. 2. The cross-head A works in a slotted guide formed by the timbers B B. These guides stand within the frame-timbers 12 12, and form the end of the bale.

Under the cross-head is attached the press-head 14, having on its underside projecting ribs, between which the ropes pass, by which the bale, when formed, is bound. Similar and corresponding ribs are placed upon the floor 1. The doors 2, on opposite sides of the press, open toward the same end. They are attached by strong hinges, calculated to resist the pressure of the bale. The inner wings of these hinges pass around and are bolted to the two inner surfaces of the posts 12.

To the opposite side of the doors, and opposite one another, are attached the catches, which project beyond the edge of the doors. Over these projections pass the eyes of a heavy iron bar which unites the two doors. The ends of the press, below and on the same level with the doors, are formed by two doors. These doors, when the press is operated, stand on a line with the inner surfaces of the guide-timbers, or nearly so, but not projecting within them, so as to interfere with the descent of the cotton.

The door shown in Fig. 1 is fastened by a strong cross-bar swinging on its center, the ends of which pass within the timbers 12 of the frame. The opposite door is held in place by the rigid bar which unites the doors 2, as explained. Both these doors rest below, against the cross-timbers of the frame. Over the doors 2 are placed axles with projecting pins, which, being turned by a lever, are employed in tightening the ropes in tying the bale.

In operating the press the press-head is raised and held suspended by a block and tackle attached to the upper part of the frame. The chamber being filled with cotton, the cables are attached, the ratchets thrown into gear with the wheels, the four levers being carried up and down, the cable is wound about the axle, and the cotton powerfully compressed by the descent of the press-head. When the bale has been formed the catches on the doors are removed, the end doors fall down, and the side doors are opened, the ropes passed around the bagging, and the bale thus formed being considerably smaller than the frame. On raising the press-head it is without difficulty removed.

I do not claim the several parts of my press, nor the general principle of its construction, all of which are old; but What I do claim as my invention, and seek to secure by Letters Patent, is—

The cotton-press constructed, arranged, and operating as and for the purposes set forth.

In testimony whereof I have signed my name to this specification in the presence of two subscribing witnesses.

I. J. WAY.

Witnesses:
R. MASON,
EDM. F. BROWN.